Feb. 16, 1971  J. D. YEAROUT  3,564,571
SEPARATION OF AIR UTILIZING A CLOSED-CYCLE
HELIUM REFRIGERATION SYSTEM
Original Filed April 4, 1966  2 Sheets-Sheet 1

JAMES D. YEAROUT
INVENTOR.

BY *Max Gelden*

ATTORNEY

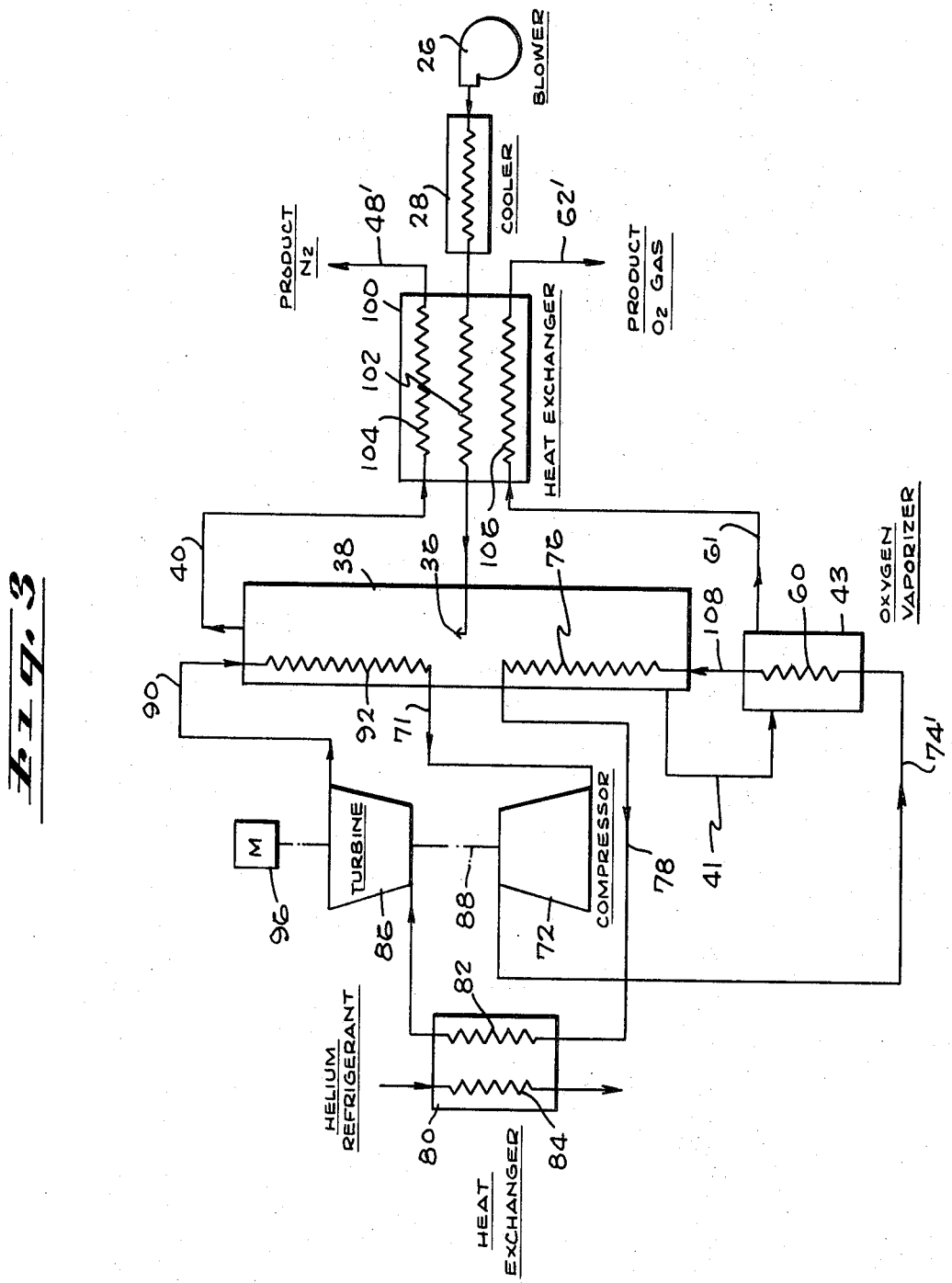

United States Patent Office 3,564,571
Patented Feb. 16, 1971

3,564,571
SEPARATION OF AIR UTILIZING A CLOSED-CYCLE HELIUM REFRIGERATION SYSTEM
James D. Yearout, Rolling Hills, Calif., assignor, by mesne assignments to McDonnell Douglas Corporation, Santa Monica, Calif., a corporation of Maryland
Continuation of application Ser. No. 539,840, Apr. 4, 1966. This application May 26, 1969, Ser. No. 828,806
Int. Cl. F25j 1/02, 3/04, 3/02
U.S. Cl. 62—40                                    12 Claims

ABSTRACT OF THE DISCLOSURE

In the separation of oxygen and nitrogen from air, the process involving introducing compressed cooled air at its saturation temperature into a fractionating column, passing another gaseous medium such as helium into heat exchange relation along the lower portion of the fractionating column, the helium being at a temperature to supply heat along the lower portion of the column, cooling the resulting heated helium, preferably by heat exchange with an external refrigerant followed by work expansion of the helium, passing the cooled helium gas into heat exchange relation along the upper portion of the column, such helium being at a temperature to remove heat along the upper portion of the column, compressing the exiting helium and recycling same in heat exchange relation along the lower portion of the column, thus effecting a differential distillation of the air in the column, and separating nitrogen overhead from the upper end of the column and liquid oxygen from the lower end of the column.

In a preferred procedure, nitrogen overhead is passed in heat exchange relation with compressed feed air for cooling same, a portion of the heated nitrogen gas is compressed and cooled, and such cool compressed nitrogen passed in heat exchange relation with liquid oxygen withdrawn from the bottom of the column, cooling the compressed nitrogen and vaporizing the oxygen, which is withdrawn as product, the cooled nitrogen is passed in heat exchange relation with the lower portion of the column, is subcooled by heat exchange relation with nitrogen overhead withdrawn from the column, is throttled, and the resulting liquid nitrogen introduced as reflux to the top of the column.

The system has the advantage of employing a single fractionating column operating at or slightly above atmospheric pressure, with reduced power consumption and increased efficiency, the only gas requiring significant compression being the portion of the gaseous nitrogen withdrawn from the upper end of the column and recycled to provide additional reflux to the column.

This application is a continuation application Ser. No. 539,840 filed Apr. 4, 1966 and now abandoned.

This invention relates to the separation of a gaseous mixture such as air by rectification, and is particularly concerned with procedure for the separation of nitrogen and oxygen, both in gaseous form, in a single rectification column utilizing "differential" distillation, and with a system for carrying out such procedure.

Nitrogen and oxygen for commercial use are usually separated from air by procedure involving liquefaction of the air, and fractional distillation so that the oxygen and nitrogen constituents are separated from each other. In the liquefaction and rectification of a gas such as air, the gas is introduced into the rectification column, e.g., at its saturation temperature, and the operational drive for the column is the temperature differential between the bottom and the top thereof. To produce such temperature differential, heat is removed from the top of the column and heat is added to the bottom of the column or the still. Hence, for example, as described in copending U.S. application Ser. No. 273,883 filed Apr. 18, 1963 of James K. La Fleur, now Patent No. 3,258,929 in the separation of air into oxygen and nitrogen, heat is added to the bottom of the column to produce rising oxygen vapors in the column, by introducing compressed air in heat exchange relation with the bottom of the column before such air is introduced into the column. Heat is removed from the top of the column to condense the nitrogen and provide a descending liquid nitrogen reflux, by introducing a refrigerant, e.g., cold gaseous helium, at a temperature below the condensation temperature of nitrogen, into heat exchange relation in the top of the column.

In the system of the above copending application, such system is designed essentially to deliver liquid products such as liquid oxygen. If, however, it is required that the air separation system produce products such as nitrogen and oxygen as gases, and particularly where such products are employed to aid in cooling the feed air stream for greater efficiency, there is insufficient heat available in the feed air stream to maintain the proper thermodynamics of the operating column to completely separate oxygen and nitrogen from the air in a single column.

It has accordingly become increasingly desirable to separate the components of a gas mixture such as air so as to recover nitrogen and oxygen as gases, employing a simple single fractionating column operating at or slightly above atmospheric pressure, economically, with reduced power consumption and at increased efficiency.

In the operation of a fractionating column, e.g., for the separation of oxygen and nitrogen from air, it has been found that the liquid and vapor in the column are near or at equilibrium only at certain points in the column. It has been found according to the invention that substantially greater efficiency is achieved and equilibrium between liquid and vapor is obtained substantially incrementally throughout the height of the column, by adding heat along the lower portion of the column below the point of introduction of the feed gas mixture or air into the column, and by removing heat along the upper portion of the column above the point of introduction of the feed gas or air. Such continuous incremental addition of heat to the lower portion of the column and continuous incremental removal of heat from the upper portion of the column results in "differential" distillation, rather than "fractional" distillation. In this manner, equilibrium is much more closely approached throughout the column, thereby substantially increasing the efficiency of the column and providing a favorable means for producing gaseous oxygen.

Briefly, the invention procedure, as applied particularly to the separation of oxygen and nitrogen from air, involves introducing air into a fractionating column, passing a gaseous medium such as helium, and which preferably has a substantially lower boiling point than air or its components nitrogen or oxygen, into heat exchange relation with the lower portion of the fractionating column under conditions to supply heat to the lower portion of said column, cooling the resulting heated helium and passing such cooled helium gas into heat exchange relation with the upper portion of such column under conditions to remove heat from said upper portion of the column. Such operation is carried out preferably under conditions to effect a differential distillation of the feed gas mixture or air in the column.

For this purpose, the helium is preferably circulated in a closed cycle through a heat pump. In such cycle the helium is compressed and heated to a temperature above the temperature of the liquid in the lower portion of the column, and is then passed in heat exchange relation with the lower portion of the column below the point of introduction of the air feed to the column, thereby adding heat to the lower portion of the column. The resulting helium is then cooled, preferably by passage in heat exchange relation with a refrigerant, e.g., the low temperature helium refrigerant of the system of U.S. Pat. 3,194,026, and the cooled helium is then expanded by passage through an expander or cold turbine, to further reduce the temperature of the helium to a temperature below the temperature of the reflux liquid in the upper portion of the column. Such cooled expanded helium is then passed in heat exchange relation through the upper portion of the column above the point of introduction of the air feed therein, extracting heat from each of the upper trays of the column. The resulting heated helium is then compressed and heated, and the cycle is repeated.

In the differential distillation thus carried out in the column, nitrogen overhead is withdrawn from the upper end of the column and liquid oxygen is removed from the lower end of the column.

In carrying out an air separation process according to a preferred embodiment of the invention, employing the above principles for supplying and removing heat from the lower and upper portions of the fractionating column, respectively, it is only necessary to compress incoming air feed to a moderate pressure somewhat above atmospheric, usually to a pressure of less than two atmospheres. Such compressed air is then cooled by heat exchange relation with nitrogen overhead gas withdrawn from the column, lowering the temperature of the compressed air to its saturation temperature, and the thus saturated air is then fed to the column intermediate the top and bottom thereof. A minor portion of the resulting heated nitrogen gas is then compressed and cooled to a temperature preferably somewhat above the temperature of the liquid oxygen withdrawn from the bottom of the column. Such cooled compressed nitrogen gas is then passed in heat exchange relation with such liquid oxygen, causing vaporization of such oxygen, which is then passed in heat exchange relation with the compressed nitrogen gas for cooling same as noted above, and the gaseous oxygen is withdrawn as product.

The nitrogen gas passed in heat exchange relation with the liquid oxygen is now partially liquefied and by further cooling such partially liquefied nitrogen as by passage thereof in heat exchange relation with the lower portion of the column followed by subcooling by heat exchange relation with nitrogen gas withdrawn from the column, and then by throttling or expansion of such subcooled nitrogen, the resulting liquid nitrogen is reduced in temperature approximately to the temperature of the refluxing liquid in the upper end of the column. Such cooled expanded liquid nitrogen is introduced into the top of the column to function as additional reflux and refrigerant therein.

According to the above process, in the air separation cycle the only gas requiring significant compression is the gaseous nitrogen withdrawn from the upper end of the column and recycled for vaporization of the oxygen and to provide additional reflux to the top of the column. The amount of such recycled nitrogen thus compressed is substantially equivalent to the amount of oxygen product evaporated, which in turn amounts to approximately 20% of the air feed. The horsepower required for compression of the air feed is relatively minor since the air feed is only compressed to a pressure somewhat above atmospheric pressure, and only sufficient to overcome friction losses, since the fractionating or "differential" distillation column is operated at a temperature about or slightly above atmospheric pressure.

According to a further modification of the invention, if desired, instead of employing recycled compressed cooled nitrogen for purposes of vaporizing the liquid oxygen, the helium provided in the helium heat pump or cycle noted above can be heated by compression to a temperature above the boiling temperature of the liquid oxygen withdrawn from the bottom of the column, and such helium first passed in heat exchange relation with such liquid oxygen to vaporize same, and the resulting heated helium then passed in heat exchange relation through the lower portion of the fractionating or distillation column as previously described.

The invention will be understood more clearly by the description below of certain embodiments of the invention applied particularly to the separation of oxygen and nitrogen from air, taken in connection with the accompanying drawing wherein:

FIG. 1 is a schematic representation of the basic novel feature of the invention;

FIG. 2 is a schematic representation of an air separation system for separating oxygen and nitrogen essentially completely in gaseous form, employing the invention principles; and FIG. 3 is a schematic representation of a modified form of air separation system, employing the invention principles.

Referring to FIG. 1 of the drawing, illustrating the basic principles of the invention, a gas mixture such as an air feed, generally in the form of its saturated vapor, is introduced into the fractionating or differential distillation column 10, at a point intermediate the top and bottom of the column. A gaseous medium, preferably helium, is passed upwardly through a heat exchanger arrangement 18 under temperature conditions such as to supply heat to the lower portion 20 of the column below the point of introduction of the air feed 12. The helium exiting the upper end of the heat exchanger 18 is then subjected to cooling by suitable means and is then introduced into and passed downwardly through the heat exchanger arrangement 22 in the upper portion of column 10 above the point of introduction of feed 12. The helium thus circulating through the heat exchanger 22 abstracts or withdraws heat from the upper portion 24 of the column, and the helium exiting the lower end of the heat exchanger 22 is then heated by suitable means and again recirculated through the lower heat exchanger 18 in the column, as noted above. A nitrogen gas overhead 14 is withdrawn from the upper end of the column and oxygen is withdrawn at 16 from the lower end of the column.

Now referring to FIG. 2 of the drawing, illustrating a preferred system for separating nitrogen and oxygen in gaseous form from air according to the invention, atmospheric air is first compressed in a blower 26 to a pressure of 1.5 atmospheres and the heat of compression of the gas is rejected by passage through a cooler 28. The compressed air now at ambient temperature of 530° R. (Rankin), is passed through coil 32 of a heat exchanger 30 in countercurrent heat exchange relation with cold nitrogen gas withdrawn from the top of the column and passed through coil 34 of the exchanger. The resulting saturated air at a temperature of about 151° R. is then introduced at 36 into a fractionating column 38. Usually, although not necessarily, the saturated air is introduced into column 38 at approximately midway between the top and bottom of the column, and at a point corresponding substantially to the composition of air in the column. The fractionating column 38 is provided with suitable means pointed out below, to bring the gas passing upward in the column into intimate contact with reflux liquid passing downwardly through the column.

In the fractionating column 38, the saturated air entering the column at 36 is permitted to expand in the column which is maintained at a pressure of about 1.3 atmospheres. The nitrogen liquid which descends from the top of the column as reflux, becomes richer in oxygen and leaner in nitrogen as it proceeds toward the bottom of the column, while the stream of oxygen vapor which rises from the bottom of the column becomes richer in nitrogen as it rises toward the top of the column. By the addition of heat to the lower portion of the column and the removal of heat from the upper portion of the column in the manner described more fully hereinafter, the descending liquid and ascending vapor in the column are brought into equilibrium throughout the height of the column.

In the operation of the column 38 nitrogen gas at 144° R. is withdrawn at 40 from the upper end of the column and oxygen in liquid form at 166° R. is withdrawn at 41 from the bottom of the fractionating column 38. The overhead nitrogen vapor is first passed through coil 44 of a heat exchanger 42 in countercurrent heat exchange relation with recycled compressed nitrogen gas passing through coil 46 for subcooling same. The exiting nitrogen vapor is then further warmed by passage through coil 34 of the heat exchanger 30 for cooling the compressed air feed, as previously described. A major portion of the resulting heated nitrogen gas now at ambient temperature (530° R.) and at atmospheric pressure is withdrawn as product at 48.

A minor portion of the nitrogen gas leaving the heat exchanger coil 34 is recycled at 49 to a compressor 50. In compressor 50 such recycled nitrogen is compressed to about 4½ atmospheres and the heat of compression of the gas is removed by passage of the compressed nitrogen through a cooler 52. The compressed nitrogen is then passed through coil 56 of a heat exchanger 54 in countercurrent heat exchange relation with cold product oxygen passing through coil 58. The cooled nitrogen gas leaving coil 56 and at a temperature of 168° R. is then passed through coil 60 of the oxygen vaporizer 43, bringing about vaporization of the liquid oxygen withdrawn from the bottom of column 38 and fed to the vaporizer 43. The saturated oxygen vapor exiting the vaporizer 43 is then passed through coil 58 of the heat exchanger 54 for cooling the compressed nitrogen as aforesaid, and the exiting oxygen gas now at approximately ambient temperature and at atmospherc pressure is withdrawn as product at 62.

The nitrogen leaving coil 60 of the oxygen vaporizer and now in liquid and gaseous form, is further cooled by passage through coil 64 in the lower portion of the fractionating column 38, and is now in liquid form. Such liquid nitrogen is subcooled by passage through coil 46 of the heat exchanger 42, to a temperature of 158° R. The resulting compressed and subcooled liquid nitrogen is then expanded through a throttling valve 66 to a pressure of about 1.4 atmospheres, and a temperature of 144° R., approximately equal to the pressure and temperature in the top of column 38, and such expanded or throttled liquid nitrogen is then introduced into the top of the fractionating column.

In the operations described above with respect to FIG. 2 of the drawing, it is seen that the only gas requiring significant compression is the recycle nitrogen which is compressed by the compressor 50. The amount of such recycle nitrogen so compressed is equivalent to the amount of oxygen product withdrawn at 62. Thus, where the oxygen product is produced at one atmosphere pressure, the amount of such nitrogen recycled and compressed at 50 is about 20% of the air feed at 26. The recycled nitrogen is compressed at 50 to a pressure permitting liquefaction of at least a portion of such recycled compressed nitrogen by the oxygen evaporated in the evaporator 43, and with which the compressed and cooled recycle nitrogen is brought into heat exchange contact. Hence, in the illustrated system above, recycled nitrogen compressed to a pressure of 4 to 4½ atmospheres and cooled to a temperature of 168° R. can be liquefied by vaporization at substantially atmospheric pressure of the liquid oxygen at about 167° R. in the vaporizer 43.

The heat which is supplied to the lower portion of the fractionating column 38 and which is removed from the upper portion of the fractionating column in order to maintain the operational drive for the column, is provided in the following manner according to the invention. Numeral 70 of the drawing represents a helium heat pump for this purpose. Helium at 71, having a pressure of 100 p.s.i.a. and a temperature of 150° R., is further compressed and heated in a compressor 72, so that the outlet helium at 74 is at a pressure of 125 p.s.i.a. and a temperature of 166° R. Such compressed and heated helium is introduced into the bottom of a heat exchanger construction 76 in the lower portion of fractionating column 38 below the air feed inlet 36. Such heat exchanger construction 76 can be in the form of a plate-fin heat exchanger (not shown) arranged so that the helium is passed in heat exchanger relation with channels bearing the liquid-vapor mixture being separated. Such channels may be constructed in the manner of a perforated fin compact heat exchanger, producing the effect of distillation column trays. This is a known type of heat exchanger arrangement described in "Compact Heat Exchangers," London and Kays, McGraw-Hill Co., New York, and since such heat exchanger forms no part of the present invention, it is not shown. Since the temperature of the helium gas passing through the heat exchanger 76 is at a temperature generally higher than the temperature in the lower portion of column 38 and above the temperature of the boiling oxygen at the lower portion of the column, heat is supplied by such helium to the lower portion of the column under conditions to provide substantial equilibrium of the vapor and liquid throughout the lower portion of the column and to provide reboil heat for supporting and maintaining boiling of the liquid oxygen in the lower portion of the column.

The helium at about 155° R. leaving heat exchanger 76 of the column is conducted via 78 to a heat exchanger 80 wherein the helium is cooled by passage through a coil 82 in heat exchange relation with a refrigerant passing through coil 84 of the exchanger. Such refrigerant in preferred practice can be refrigerant helium gas at a substantially lower temperature than the helium at 78, and which refrigerant is produced by the system of the above noted La Fleur Patent 3,194,026. The cooled helium at 85 following passage thereof through heat exchange coil 82, is at a temperature of 150° R. and is expanded in an expander or cold turbine 86 so that the expanded helium at 90 is now reduced in temperature to 140° R. and to a pressure of 100 p.s.i.a. The work energy derived from the turbine 86 is used as a part of the energy required for driving the compressor 72, via a common coupling 88.

The cold expanded helium at 90 is then passed into the upper end of a heat exchanger arrangement 92 which can be of the plate-fin type similar to that of the heat exchanger 76, and arranged so that the helium passing therethrough is in heat exchange relation with the liquid-vapor mixture in the upper portion of the column 38, as described above with respect to the heat exchanger 76 in the lower portion of the column. Since the helium passing downwardly in the heat exchanger 92 is at a temperature below the temperature of the upper portion of column 38 and below the temperature of the reflux liquid in the upper portion of the column, heat is withdrawn from the upper portion of the column under conditions to maintain the liquid and vapor in substantial equilibrium and to provide sufficient reflux nitrogen for the column. The helium leaving the lower end of the heat exchanger 92 is now increased in temperature to 150° R. and is compressed in the compressor 72 to increase the pressure and temperature of the helium for recirculation thereof to the heat exchanger 76 is in the lower portion of the column, and the helium is then recycled in the manner described above. A motor 96 is provided to spin the turbine 86 at the commencement of operation, and to provide the additional energy required for compression of the helium at 72.

Referring now to FIG. 3 of the drawing illustrating a modification of the system described above and illustrated in FIG. 2, in the system of FIG. 3, instead of employing recycled compressed nitrogen for vaporizing the liquid oxygen, the operation of the helium heat pump cycle is modified to compress the helium to a higher pressure and temperature so as to utilize same for vaporization of the liquid oxygen.

Thus, referring to FIG. 3, the slightly compressed air feed, following cooling thereof at 28, is passed through a heat exchanger 100 in countercurrent heat exchange relation with both the cold overhead nitrogen withdrawn from the top of the column 40 and passing through coil 104 of the heat exchanger 100, and the saturated oxygen vapor exiting the oxygen evaporator at 61 and passing through coil 106 of such heat exchanger. Hence, all of the overhead nitrogen withdrawn from the top of the column and exiting the heat exchanger coil 104, is withdrawn as nitrogen product at 48', and the vaporized oxygen is heated by passage through the heat exchanger 100 and recovered as gaseous oxygen at 62'.

To provide the required heat for vaporization of the liquid oxygen withdrawn at 41 and circulated through the oxygen vaporizer 43, the helium circulating in the heat pump cycle 70 is compressed in compressor 72 to a pressure of about 150 p.s.i.a. and a temperature of about 175° R. and is then conducted via 74' to coil 60 of the oxygen vaporizer 43, where heat supplied by the helium vapor effects vaporization of the liquid oxygen which passes through outlet 61, and the resulting helium at 108 leaving the oxygen vaporizer coil 60, and at a temperature of about 167° R. is fed directly into the lower end of the heat exchanger 76 in the lower portion of column 38, to provide heat to the lower portion of column 38 in the manner described above. In the operation of the helium heat pump, since liquid nitrogen is not recycled as additional reflux to the top of the fractionation column 38, the helium is expanded in the turbine 86 to a lower temperature, that is, to about 130° R., than in the case of the operation of the system of FIG. 2, thereby supplying additional refrigerant capacity in heat exchanger 92 in the upper portion of the fractionating column.

It will be understood that the systems described above with relation to FIGS. 2 and 3, including the pressures and temperatures set forth, are only illustrative and are not intended as limitative of the invention.

For producing gaseous oxygen as product according to the invention process as described above and as illustrated in FIGS. 2 and 3, there can be obtained a reduction of approximately one-third in overall horsepower requirement as compared to a conventional air separation system for obtaining gaseous oxygen, for example, by employment of the conventional double column unit. Such significant reduction in power consumption in the process of the invention is due primarily to the differential distillation principles of the invention whereby substantial equilibrium is attained between vapor and liquid in the column 38 throughout the height of the column. Also, since for a given output, efficiency is increased and a lower overall horsepower is required, the result is a substantial reduction in capital investment for equipment.

The operation of the systems described above and illustrated in FIGS. 2 and 3 can be controlled so that substantially all of the argon in the air feed is removed with the overhead nitrogen vapor at 40, or all of the argon is removed with all of the oxygen withdrawn from the bottom of the column at 41, or so that controlled amounts of argon can be present both in the overhead nitrogen from the column and in the oxygen withdrawn from the bottom of the column. This can be accomplished by controlling the temperature of the helium passing through heat exchanger units 76 and 92 of the column, and by the amount of recycle compressed nitrogen introduced as reflux at 68 into the column in the system of FIG. 2.

In preferred practice a plate-fin type of heat exchanger arrangement is employed in the column at 76 and 92 to bring the helium passing lengthwise through the lower and upper portions of the column into efficient heat exchange relation with the liquid and gas throughout such column portions, and to supply heat along such lower column portion and to remove heat along such upper column portion so as to effect differential distillation. However, any suitable form of heat exchange arrangement can be employed for this purpose. Thus, for example, a column having conventional trays or plates can be employed with suitable heat exchanger means employed for conducting the helium into heat exchange relation with such trays or plates, preferably so as to effect the above described differential distillation in the column.

It will be understood that various gases other than helium can be employed for circulation through the lower and upper heat exchangers 76 and 92 of the fractionating columns in the systems of FIGS. 2 and 3, under conditions to supply heat to the lower portion of the column, and to function as refrigerant and to withdraw heat from the upper portion of the column, according to the invention principles, as in the case of the helium described above. Thus, for example, instead of helium, there can be employed gases such as neon or hydrogen, and if desired, nitrogen can also be employed for this purpose provided the nitrogen introduced at 90 into heat exchanger 92 of the fractionating column is under reduced pressure, or the interior of the column is pressurized so that the gaseous nitrogen passing through 92 is at a temperature lower than the interior of the upper portion of column 38, and to thereby function as a refrigerant therein. It is noteworthy that in the closed cycle or heat pump 70 which supplies the medium for adding heat to the lower portion of the column and abstracting heat from the upper portion of the column, such medium remains in the gaseous state throughout the cycle.

Although the invention system as described above is designed particularly for the separation of nitrogen and oxygen from air, the principles of the invention and the systems illustrated in FIGS. 1 to 3 of the drawing can be similarly applied to the separation of the components of a mixture of gases containing two gas components having different boiling points, and the gas mixture having a boiling point intermediate the boiling points of the two gas components. Thus, according to the invention principles as described above, such gas components can be separated from such gas mixture by first compressing the gas mixture to a moderate pressure, passing the gas mixture into heat exchange relation with gaseous overhead removed from the upper portion of the column and/or gas component removed from the lower portion of the column, to cool such gas mixture approximately to the saturation point of the gas mixture, introducing the cooled saturated gas mixture into a fractionating column at a point intermediate the top and bottom of the column, passing another gas into heat exchange relation with the lower portion of said column under conditions to supply heat to the lower portion of said column and to effect a differential distillation therein as described above, cooling said last mentioned gas and passing said cooled gas into heat exchange relation with the upper portion of the column under conditions to remove heat from said upper portion of the column and effecting a differential distillation therein, as previously described.

From the foregoing, it is seen that the invention provides a novel improved method particularly designed for separating nitrogen and oxygen as gases from air, employing a single fractionating column operating under substantially atmospheric pressure, with a substantial reduction in power consumption and corresponding increase of efficiency, and with a substantial reduction in capital expense.

While I have described particular embodiments of my invention for the purpose of illustration, it should be understood that various modifications and adaptations thereof may be made within the spirit of the invention, and within the scope of the appended claims.

I claim:
1. A process for the separation of the components of a mixture of gases containing two gases having different boiling points, the first of said gases having a lower boiling point than the second of said gases and said gas mixture having a boiling point intermediate the boiling points of said two gases, which comprises moderately compressing said gas mixture, cooling said compressed gas mixture approximately to the saturation point thereof, introducing said cooled saturated gas mixture into a fractionating column at a point intermediate the top and bottom of said column, passing a third gas in a closed cycle:
  (A) into indirect heat exchange relation along a length of the lower fractionating portion of said column which is above the bottom of said column and below the point of introduction of said gas mixture, said third gas having a temperature higher than the temperature of the liquid in said lower portion of said column, thereby effecting continuous addition of heat to the column contents along said lower column portion;
  (B) cooling said third gas exiting the lower portion of said column to a temperature below the temperature of the liquid in the upper portion of said column;
  (C) passing said cooled gas into indirect heat exchange relation along a length of the upper fractionating portion of said column which is above the point of introduction of said gas mixture into said column and below the top of said column, thereby effecting continuous removal of heat from the column contents along said upper column portion, whereby a differential distillation of said gas mixture is effected in said column; and
  (D) recycling said third gas to step A; which includes withdrawing said first gas of said gas mixture from the upper end of said column and withdrawing said second gas in liquid form from the lower end of said column, passing said first gas in heat exchange relation with said gas mixture to cool same prior to introduction thereof into said column, compressing a portion of said first gas and passing said compressed first gas into heat exchange relation with said second gas in liquid form withdrawn from said column, and vaporizing said second gas in liquid form, passing said first compressed gas into heat exchange relation along a lower fractionating portion of said column to liquefy said first compressed gas, throttling said liquefied first compressed gas to a temperature and pressure approximately equal to the temperature and pressure in the upper portion of said column, and introducing said cooled throttled first gas in liquid form into the top of said column.

2. A process as defined in claim 1, said third gas being passed into indirect heat exchange relation upwardly along substantially the entire length of the lower fractionating portion of said column, and said cooled third gas being passed downwardly in countercurrent indirect heat exchange relation along substantially the entire length of the upper fractionating portion of said column.

3. A process as defined in claim 2, said cooling of said third gas in step B including work expanding said third gas; and including compressing said third gas following step C to a higher pressure and a higher temperature prior to recycling said third gas to step A.

4. A process for the separation of the components of air containing oxygen and nitrogen having different boiling points in a single fractionating column, the nitrogen gas having a lower boiling point than the oxygen gas and said air having a boiling point intermediate the boiling point of said oxygen and nitrogen, which comprises moderately compressing said air, cooling said air approximately to the saturation point thereof, introducing said cooled saturated air into a fractionating column at a point intermediate the top and bottom of said column, passing helium in a closed cycle, in which the closed cycle is in the gas phase throughout:
  (A) into indirect heat exchange relation upwardly along a substantial length of the lower fractionating portion of said column which is above the bottom of said column and below the point of introduction of said air, said helium having a temperature higher than the temperature of the liquid in said lower portion of said column thereby affecting continuous addition of heat to the column contents along said lower column portion;
  (B) cooling said helium exiting the lower portion of said column to a temperature below the temperature of the liquid in the upper portion of said column;
  (C) passing said cooled helium downwardly into indirect heat exchange relation along a substantial length of the upper fractionating portion of said column which is above the point of introduction of said air into said column and below the top of said column, thereby affecting continuous removal of heat from the column contents along said upper column portion, whereby a differential distillation of said air is effected in said column; and
  (D) recycling said helium to Step A.

5. A process as defined in claim 4, said helium being passed into indirect heat exchange relation upwardly along substantially the entire length of the lower fractioning portion of said column, and said cooled helium being passed downwardly in countercurrent indirect heating exchange relation along substantially the entire length of the upper fractionating portion of said column.

6. A process as defined in claim 4, said cooling of helium in Step B including work expanding said helium; and including compressing said helium following Step C to a higher pressure and a higher temperature prior to recycling said helium to Step A.

7. A process as defined in claim 4 wherein cooling of said helium in Step B includes passing said helium in indirect heat exchange relation with a refrigerant at a low temperature.

8. The process according to claim 7 wherein in Step B after the helium is passed in indirect heat exchange relation with a refrigerant at a low temperature, said helium is work expanded, said process also including compressing said helium following Step C to a higher pressure and a higher temperature prior to recycling said helium to Step A.

9. A process for the separation of the components of a mixture of gases containing two gases having different boiling points, the first of said gases having a lower boiling point than the second of said gases and said gas mixture having a boiling point intermediate the boiling points of said two gases, which comprises moderately compressing said gas mixture, cooling said compressed gas mixture approximately to the saturation point thereof, introducing said cooled saturated gas mixture into a fractionating column at a point intermediate the top and bottom of said column, passing a third gas in a closed cycle:
  (A) into indirect heat exchange relation along a length of the lower fractionating portion of said column which is above the bottom of said column and below the point of introduction of said gas mixture, said third gas having a temperature higher than the temperature of the liquid in said lower portion of said column, thereby effecting continuous addition of heat to the column contents along said lower column portion;
  (B) cooling said third gas exiting the lower portion of said column to a temperature below the temperature of the liquid in the upper portion of said column;
  (C) passing said cooled gas into indirect heat exchange relation along a length of the upper fractionating portion of said column which is above the point of introduction of said gas mixture into said column and below the top of said column, thereby effecting continuous removal of heat from the column contents along said upper column portion, whereby a differential distillation of said gas mixture is effected in said column; and (D) recycling said third gas to step A;
wherein said mixture of gases is air, said first gas is nitrogen, said second gas is oxygen and said third gas is helium, said cooling said helium in step B including passing said helium in indirect heat exchange relation with a refrigerant at a low temperature, and work expanding said helium; and including compressing said helium following step C to a higher pressure and a higher temperature prior to recycling said helium to step A; and which includes withdrawing nitrogen from the upper end of said column and withdrawing oxygen in liquid form from the lower end of said column, passing said withdrawn nitrogen in heat exchange relation with said air to cool same prior to introduction thereof into said column, compressing a portion of said exiting nitrogen and passing said compressed nitrogen into heat exchange relation with said oxygen in liquid form withdrawn from said column, and vaporizing said liquid oxygen, passing said exiting compressed nitrogen into heat exchange relation along a lower fractionating portion of said column to liquefy said compressed nitrogen, throttling said liquefied compressed nitrogen to a temperature and pressure approximately equal to the temperature and pressure in the upper portion of said column, and introducing said cooled throttled nitrogen in liquid form into the top of said column.

10. A process for the separation of the components of a mixture of gases containing two gases having different boiling points, the first of said gases having a lower boiling point than the second of said gases and said gas mixture having a boiling point intermediate the boiling points of said two gases, which comprises moderately compressing said gas mixture, cooling said compressed gas mixture approximately to the saturation point thereof, introducing said cooled saturated gas mixture into a fractionating column at a point intermediate the top and bottom of said colum, passing a third gas in a closed cycle:

(A) into indirect heat exchange relation along a length of the lower fractionating portion of said column which is above the bottom of said column and below the point of introduction of said gas mixture, said third gas having a temperature higher than the temperature of the liquid in said lower portion of said column, thereby effecting continuous addition of heat to the column contents along said lower column portion;

(B) cooling said third gas exiting the lower portion of said column to a temperature below the temperature of the liquids in the upper portion of said column;

(C) passing said cooled gas into indirect heat exchange relation along a length of the upper fractionating portion of said column which is above the point of introduction of said gas mixture into said column and below the top of said column, thereby effecting continuous removal of heat from the column contents along said upper column portion, whereby a differential distillation of said gas mixture is effected in said column; and (D) recycling said third gas to step A;
wherein said mixture of gases is air, said first gas is nitrogen, said second gas is oxygen and said third gas is helium, said cooling said helium in step B including passing said helium in indirect heat exchange relation with a refrigerant at a low temperature, and work expanding said helium; and including compressing said helium following step C to a higher pressure and a higher temperature prior to recycling said helium to step A; and which includes withdrawing nitrogen from the upper end of said column and withdrawing oxygen in liquid form from the lower end of said column, and including passing said compressed helium gas at a temperature above the temperature of said withdrawn liquid oxygen, into heat exchange relation with said liquid oxygen to evaporate same, prior to recycling said compressed helium to step A.

11. A process for the separation of oxygen and nitrogen from air in a single fractionating colmun, which comprises moderately compressing air, cooling said compressed air approximately to its saturation temperature, introducing said cooled saturated air into a fractionating column, at a point intermediate the top and bottom of said column, passing helium in heat exchange relation upwardly along the lower portion of said column below the point of introduction of the air feed, said helium having a temperature higher than the temperature of the liquid in the lower portion of said column, cooling said helium exiting the lower portion of said column to a temperature below the temperature of the liquid in the upper portion of said column, said cooling of said helium including work expansion of said helium, passing said expanded cooled helium into heat exchange relation downwardly along the upper portion of said column above the point of introduction of said air feed into said column, and effecting a differential distillation of the mixture in said column, withdrawing nitrogen from the upper end of said column and withdrawing oxygen in liquid form from the lower end of said column, passing said nitrogen in heat exchange relation with said compressed air to cool same prior to introduction thereof into said column, compressing a portion of the resulting heated nitrogen and passing said compressed nitrogen into heat exchange relation with said oxygen in liquid form withdrawn from said column, and vaporizing said oxygen in liquid form, passing said vaporized oxygen in heat exchange relation with said compressed nitrogen to cool same prior to passage of said cooled compressed nitrogen into heat exchange relation with said oxygen in liquid form, passing said cooled compressed nitrogen into heat exchange relation with the lower portion of said column to liquefy said compressed nitrogen, throttling said liquefied compressed nitrogen to cool same and reduce its pressure, said liquefied cooled compressed nitrogen being throttled to a temperature and pressure approximately equal to the temperature and pressure in the upper portion of said column, and introducing said cooled, throttled nitrogen in liquid form into the top of said column.

12. The process for the separation of oxygen and nitrogen from air in a single fractionating column, and recovering oxygen product as gas, which comprises compressing air to a pressure somewhat above atmospheric pressure, cooling said compressed air to its saturation temperature, introducing the resulting saturated air into said column substantially midway of the height thereof, and at a point corresponding substantially to the composition of air in the column, and allowing said saturated air to expand therein, the interior of said column being maintained at a pressure slightly above atmospheric pressure, passing helium having a temperature above the temperature of the liquid in the lower portion of said column, in heat exchange relation upwardly through the lower portion of said column below the point of introduction of said liquefied air into said column, said helium supplying heat to the lower portion of said column and cooling said helium passing the exiting helium in heat exchange relation with a refrigerant in the form of low temperature helium gas to further cool said helium, expanding said helium and deriving work from said expansion to cool said helium to a still lower temperature, passing the cooled expanded helium gas at a temperature below the temperature of the liquid in the upper portion of said column, downwardly through the upper portion of said column and above the point of introduction of said compressed liquefied air into said column, said last mentioned helium removing heat from the upper portion of said column and heating said helium, compressing said heated helium to a higher temperature and pressure, the energy derived from said expansion of said cooled helium being employed for said compression of said heated helium, and passing said heated compressed helium into heat exchange relation with the lower portion of said column as aforesaid, and effecting a differential distillation of said air in said column, withdrawing nitrogen gas from the upper end of said column and withdrawing liquid oxygen from the lower end of said column, passing said withdrawn nitrogen gas into heat exchange relation with said compressed air for cooling same to its saturation temperature as aforesaid, compressing a portion of said nitrogen gas, said nitrogen gas being compressed to a pressure permitting liquefaction of at least a portion of said compressed nitrogen by heat exchange relation thereof with said withdrawn liquid oxygen at substantially atmospheric pressure, cooling said compressed nitrogen, passing said cooled compressed nitrogen gas into heat exchange relation with said liquid oxygen to vaporize same, passing said vaporized oxygen into heat exchange relation with said compressed nitrogen gas for cooling same as aforesaid, and withdrawing gaseous oxygen as product, passing the exiting partially liquefied and compressed nitrogen in heat exchange relation with the lower portion of said column to produce substantially complete liquefaction of said nitrogen, passing said liquid nitrogen in heat exchange relation with the nitrogen gas withdrawn from said column for subcooling said liquid nitrogen, throttling said exiting compressed liquid nitrogen to a lower temperature and pressure, approximately equal to the temperature and pressure in the upper end of said column, and introducing said expanded liquid nitrogen into the upper end of said column.

References Cited

UNITED STATES PATENTS

| | | | |
|---|---|---|---|
| 2,284,662 | 6/1942 | Kahle | 62—22X |
| 2,450,894 | 1/1949 | Collins | 62—40X |
| 2,503,265 | 4/1950 | Haynes | 62—28 |
| 2,690,060 | 9/1954 | Legatski | 62—28 |
| 2,692,484 | 10/1954 | Etienne | 62—28X |
| 2,713,781 | 7/1955 | Williams | 62—40 |
| 2,729,954 | 1/1956 | Etienne | 62—28 |
| 2,762,208 | 9/1956 | Dennis | 62—40X |
| 3,354,662 | 11/1967 | Daunt | 62—40 |

REUBEN FRIEDMAN, Primary Examiner

A. F. PURCELL, Assistant Examiner

U.S. Cl. X.R.

62—28, 29